United States Patent [19]

Baasner et al.

[11] Patent Number: 4,659,091
[45] Date of Patent: Apr. 21, 1987

[54] SEALING RING FOR SEALING AN ARTICULATED CONNECTION

[75] Inventors: Ernst Baasner, Monheim; Klaus Lönne; Klaus-Peter Majewski, both of Burscheid, all of Fed. Rep. of Germany

[73] Assignee: Goetze AG, Burscheid, Fed. Rep. of Germany

[21] Appl. No.: 730,243

[22] Filed: May 3, 1985

Related U.S. Application Data

[63] Continuation of Ser. No. 531,452, Sep. 12, 1983, abandoned.

[30] Foreign Application Priority Data

Sep. 16, 1982 [DE] Fed. Rep. of Germany ....... 3234376

[51] Int. Cl.⁴ .................... F16J 15/12; F16L 27/06; B32B 15/02
[52] U.S. Cl. ......................... 277/1; 277/227; 277/235 R; 277/DIG. 6; 277/106; 277/30; 285/267; 285/910; 285/917; 264/257; 264/501; 264/512; 428/36; 428/242; 428/288
[58] Field of Search ................ 277/DIG. 6, 227, 229, 277/1, 106, 230, 235 R, 96.2, 235 B; 285/267, 269, DIG. 11, DIG. 18; 264/257, 258, 268, 501, 502, 512, 320; 428/36, 288, 240, 242

[56] References Cited

U.S. PATENT DOCUMENTS

| 2,372,773 | 4/1945 | Fiechter ........................ 277/230 X |
| 2,376,039 | 5/1945 | Driscoll et al. ................ 277/230 X |
| 3,044,922 | 7/1962 | Kappel ........................... 264/324 |
| 3,404,061 | 10/1968 | Shane et al. ................. 277/DIG. 6 |
| 3,957,278 | 5/1976 | Rabe ............................. 277/227 |
| 4,097,071 | 6/1978 | Crawford et al. ............... 285/267 |
| 4,169,911 | 10/1979 | Yoshida et al. ............... 428/288 X |
| 4,417,733 | 11/1983 | Usher ........................ 277/DIG. 6 |
| 4,423,544 | 1/1984 | Kashmerick et al. ......... 277/DIG. 6 |

FOREIGN PATENT DOCUMENTS

| 115750 | 8/1942 | Australia ...................... 277/235 |
| 1736840 | 12/1956 | Fed. Rep. of Germany . |
| 2829333 | 5/1979 | Fed. Rep. of Germany . |
| 2845949 | 4/1980 | Fed. Rep. of Germany . |
| 3107920 | 5/1982 | Fed. Rep. of Germany . |
| 3234376 | 3/1984 | Fed. Rep. of Germany . |
| 3949 | of 1909 | United Kingdom ............. 277/235 |
| 575620 | 2/1946 | United Kingdom ......... 277/DIG. 6 |
| 777504 | 6/1957 | United Kingdom . |
| 1113320 | 5/1968 | United Kingdom ............. 277/230 |

Primary Examiner—Robert S. Ward
Attorney, Agent, or Firm—Spencer & Frank

[57] ABSTRACT

A sealing ring having at least one jacket face serving as a slide surface is produced of fibers and sliding agent that are passed to one another, with the fibers being relatively short fibers.

32 Claims, 3 Drawing Figures

SEALING RING FOR SEALING AN ARTICULATED CONNECTION

This application is a continuation of application Ser. No. 531,452 filed Sept. 12, 1983 and now abandoned.

BACKGROUND OF THE INVENTION

The present application relates to a sealing ring, particularly for sealing articulated pipe connections, such as, in particular, a highly heat resistant sealing ring for sealing articulatedly connected exhaust pipes, the sealing ring having at least one jacket face which serves as a slide surface and is made of a material containing pressed together fibers and sliding agents.

It is known, for example from DE-GM No. 1,736,840, to articulatedly join the pipe ends of an exhaust pipe and an exhaust gas manifold so as to avoid a transfer of vibrations coming from the engine. For this purpose, a pipe coupling system is used which operates according to the known ball-and-socket principle in which the points of connection of the pipes are designed as matching ball segment and ball socket segment, respectively, so that a certain angular mobility, or relative movement, between the pipes is permitted. The sealing ring connected therebetween is adapted to the outline of the joint and at least one of its jacket faces is given the outline of the matching ball segment or ball socket segment. It thus performs the function of a slide bearing for the pipes.

In view of the functions to be performed, such sealing rings are made of anti-friction materials. According to DE-OS No. 2,829,333, DE-PS No. 2,845,949 and DE-OS No. 3,107,920, such materials today are preferably compressed anti-friction materials with embedded, relatively long metal fibers for reinforcement. The metal fibers employed, according to DE-PS No. 2,845,949, are advisably long fibers so that the rings have sufficient strength. According to DE-OS No. 2,829,333, the metal fiber skeleton is correspondingly made of a steel wire fabric which has been wound or folded onto an appropriately shaped core and, after coating with graphite plate material, is pressed into the desired shape. However, in such sealing rings, the inserted wire fabric is relatively rigid. Wires may break, particularly at the points where the wire fabric is folded, and may penetrate the graphite layer. These wire tips may then produce wear traces on the slide faces of the pipes, ultimately resulting in destruction of the pipes.

For that reason, DE-OS No. 3,107,920 employs embedded metal fiber wool instead of embedded wire fabrics. Thus, substantially thinner metal fibers can be used and with the irregular orientation of the metal fibers, the danger of the fibers pressing through and thus causing wear on the sealing surface is substantially avoided.

The drawback of all of the sealing rings disclosed in these three patents, however, is their costly, multistage manufacture. Initially the sealing ring skeletons must be shaped, possibly with prepressing, from the metal fabrics or metal fiber wool balls, then the metal skeleton is saturated and coated with the solid sliding agent which is possibly present in suspension, and only then is the ring pressed in a mold to attain the desired contour.

As a result of the method employed to manufacture the sealing ring, the sliding agent is nonuniformly distributed over the cross section of the sealing ring and is applied primarily as a coating to the surfaces of the sealing ring. However, such coatings adhere only poorly to the metal fiber skeleton and break relatively easily, so that the layers may break or chip off. The then exposed fibers and wires may produce wear damage at the sealing faces of the pipes and this may possibly develop into major corrosion damage. Primarily during engine operation, the relatively long fibers fray over their entire fiber length so that gradually the entire sealing ring is destroyed.

SUMMARY OF THE INVENTION

It is therefore an object of the present invention to provide an improved sealing ring, and particularly an improved sealing ring having at least one jacket face which serves as a slide surface, preferably for sealing articulatedly connected exhaust gas conduits.

A further object of the present invention is to provide such a ring which is easily and economically manufactured and which has sufficient heat and media resistance as well as sufficient strength so that it can be used without danger of destruction from fraying or due to fibers and anti-friction material breaking out, particularly in the exhaust gas conduits of combustion engines.

Additional objects and advantages of the present invention will be set forth in part in the description which follows and in part will be obvious from the description or can be learned by practice of the invention. The objects and advantages are achieved by means of the products, instrumentalities and combinations particularly pointed out in the appended claims.

To achieve the foregoing objects and in accordance with its purpose, the present invention provides a sealing ring having at least one jacket face serving as a sliding surface, the ring comprising a sliding material within which fibers and sliding agent are pressed to one another, and wherein the fibers have a relatively short fiber length.

Preferably, the fibers have an average length, depending on their particular use, of between about 1 and 8 mm and an average diameter of about 0.05 to 0.6 mm. From fibers of such dimensions and the usually powder to flake shaped sliding agents, it is easy to produce a uniform mixture. When the sealing ring is pressed together, the short fibers used according to the present invention then form a fiber sheet of good strength with the sliding agent being uniformly embedded in their interstices.

It is to be understood that both the foregoing general description and the following detailed description are exemplary and explanatory, but are not restrictive of the invention.

DETAILED DESCRIPTION OF THE INVENTION

Figure 1:
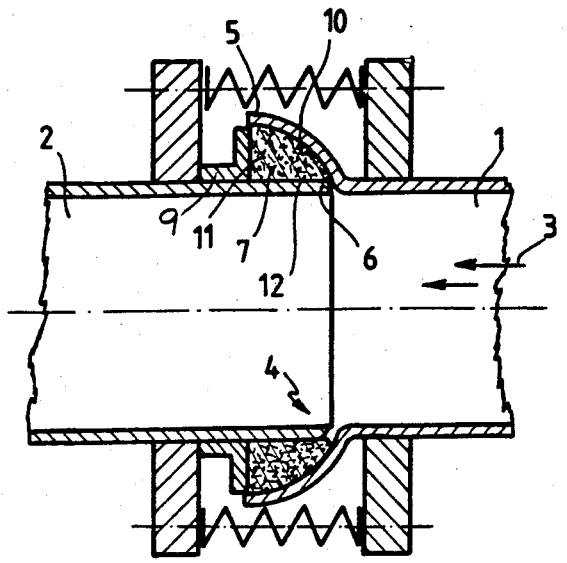
FIG. 1 is a cross-sectional view of an articulated pipe connection for an exhaust gas system employing a sealing ring made in accordance with the present invention.

The fibers which are employed with preference in the practice of the present invention are metal fibers or metal wires. In principle, however, it is also possible to use inorganic fibers or heat resistant synthetic organic fibers or a mixture of the various types of fibers.

The preferred metal fibers, due primarily to their corrosion resistance, are high-grade steel fibers. In principle, however, fibers of unalloyed steel, weakly alloyed steel, copper, aluminum, bronze or brass can also be used, individually or in mixture. The term "individually or in mixture" as used throughout the specification indicates that only one type of the recited components or a mixture of the recited components can be employed. At least part of the metal fibers may be provided with an electrochemical coating of primarily nickel, copper and/or tin, or also of zinc and aluminum so as to, on the one hand, specially protect the fibers against corrosive attacks and, on the other hand, plastically deform the material and cause it to flow during manufacture of the sealing ring, thus better bonding together the individual fibers.

The preferred inorganic fibers are ceramic fibers, glass wool fibers, slag wool fibers or rock wool fibers, individually or in mixture. The heat resistant synthetic organic fibers are preferably polyamide, polyaramid, polyimide, or polyfluorocarbon fibers, individually or in mixture. The surfaces of at least part of the fibers can be roughened in a chemical process, such as, in particular, an etching process, or in a mechanical process, so as to impart better adhesion between the fibers and better adhesion of the fibers to the sliding agent. In principle, however, at least part of the fibers may be coated with organic polymers or may be chemically surface treated, particularly by phosphatizing, so that improved corrosion protection or improved fiber bonds are realized.

The sliding agents employed are preferably the known solid lubricants in powder or flake form, such as primarily graphite, boron nitride, calcium fluoride, slide metals, molybdenum disulfide or mica, individually or in mixture.

Depending on the case of use, the fiber/sliding agent mixtures comprise 10 to 90 parts by weight fibers and 10 to 90 parts by weight sliding agents.

To the fiber/sliding agent mixtures there may be added such organic substances in powder to short fiber form, at preferably up to about 10 parts by weight, which then pyrolize in the heat of operation while forming coke-like decomposition products. Such substances are preferably short polyacrylonitrile fibers which decompose while forming carbon fibers and then act as sliding agent.

Moreover, the fiber/sliding agent mixture may contain up to preferably 10 parts by weight of such substances which decompose in the heat of operation while forming decomposition products which themselves react chemically primarily with the metal fibers and form surface protection or slide layers. Such substances are preferably sodium thiosulfate, boron carbide ($B_4C$) and/or calcium borofluoride.

Additionally, the fiber/sliding agent mixtures may contain up to about 20 parts by weight solid binders which, as phenol resin in particular, harden under the compressive pressure and/or at increased temperatures and thus improve the bond between the individual components.

If necessary, up to 100 parts by weight solid fillers in powdered to finely fibrous form may be added to the mixtures. Such fillers are preferably of mineral origin, such as porcelain earth, diatomaceous earth, quartz sand, alumina or ground glasses, or the fillers can be metal powders, preferably of aluminum, iron or copper. The fillers may be used individually or in mixture. A mixture of metal powder and filler of mineral oxygen can be used.

The sealing ring according to the present invention preferably includes a uniform distribution, over its cross section, of fiber components, sliding agents and additives. The fiber components form a firm fiber sheet and are uniformly surrounded by the sliding agents and additives. To manufacture such rings, the mixtures are first produced of the individual components, these mixtures are then put into an appropriate mold, and are pressed into the desired shape by a correspondingly high pressure of usually up to 200 ton.

If necessary, however, the sliding agent concentration may be greater in the region of the slide faces than in the region of the sealing faces which are only under static stress. It is likewise within the scope of the present invention to have the fiber components larger in the statically stressed sealing face regions than in the remaining regions. Further, different types of fibers, depending on the intended use, can be used in the statically stressed sealing face region than in the remaining regions. Likewise, the concentrations of additives, such as particularly the binders or fillers, may be larger in the center region of the sealing ring than in its outer surface regions.

Such rings may then be manufactured from various mixtures containing different amounts of fiber, sliding agents and additives. These mixtures are then filled into the mold in a corresponding manner so that pressing produces a sealing ring which has the desired distribution of the individual components.

It is also within the scope of the present invention to manufacture such rings of uniform mixtures. These are subjected, after being loosely filled into the mold, primarily to vibrations, rotations and/or magnetic forces, so that the final mixtures appear in the mold with the desired distribution of the individual components.

The present invention thus provides, in a simple and cost-effective manner, a sealing ring, particularly for sealing articulated connections of exhaust gas conduits. Contrary to the prevailing view in the art that long stranded fibers must be used for such sealing rings so that the ring achieves sufficient strength, the present invention has surprisingly revealed that relatively short fibers, usually only up to 1 to 8 mm in length, are entirely sufficient to obtain a sealing ring having sufficient strength for such uses. The previously customary formation of a ring skeleton of fibers which must then be saturated and coated with the slide material is no longer required. Rather, the sealing ring can be produced by compression practically in a single step from one or several mixtures of all components, possibly with different distribution of components in such mixtures. The short fibers employed according to the present invention, when compressed, form a fiber sheet and impart sufficient strength to the sealing ring. The slide agents and any additives which may be present have a much firmer bond with this fiber sheet and are distributed in the desired manner so that the danger of breakouts is substantially prevented.

The following examples are given by way of illustration to further explain the principles of the invention. These examples are merely illustrative and are not to be understood as limiting the scope and underlying principles of the invention in any way. All percentages referred to herein are by weight unless otherwise indicated.

EXAMPLE 1

The starting material is comprised of high-grade steel fibers having an average fiber length of 3 mm and an average diameter of 0.15 mm with flaked graphite as the sliding agent. Both components were mixed together under shaking and stirring at a ratio of 1:1 and pressed under a load of 50 t into a mold having the outlines of a sealing ring 7 of FIG. 1. The resulting sealing ring was tested for its resistance to a temperature of 500° C. and for its strength. Both measurements produced good values suitable for use of the material as exhaust slide ring seals.

In FIG. 1, sealing ring 7 is in its installed state. An exhaust gas manifold 1 is positioned adjacent an exhaust gas discharge pipe 2 through which the exhaust gas flows in the direction of flow 3. At the point of connection 4, exhaust gas manifold 1 is deformed to the shape of a spherical shell segment 5. The end 6 of exhaust gas manifold 2 is cylindrical. Pipe 2 is further provided, near end 6, with flange 9 of right angle cross section. Sealing ring 7 is installed between the two pipes, 1 and 2. Sealing ring 7 has an outer jacket face 10 in the form of a spherical segment which serves as a slide surface and is adapted to the deformed end 5 of the exhaust gas manifold. The faces of sealing ring 7 which have a straight cross section are supported against, and form a seal with, pipe end 6 and flange 9. In sealing ring 7, the high-grade steel fibers 11 form a firm fiber sheet in which graphite 12 is uniformly distributed.

The sealing ring according to the present invention was examined in an engine test and in simulation test stands. It exhibited neither damage from breakouts in the region of its surfaces nor decomposition or corrosion phenomena.

EXAMPLE 2

From the two components, high-grade steel fibers and flaked graphite, according to Example 1, two mixtures were produced.

Firstly, a mixture was produced containing 10 parts by weight high-grade steel fibers and 90 parts by weight flaked graphite. Secondly, a mixture was produced containing 10 parts by weight high-grade steel fibers and 90 parts by weight flaked graphite. Both mixtures in succession were placed into the press mold so that the mixture rich in graphite was appropriately disposed in the slide surface region to be formed in a sealing ring 13. After sealing ring 13 was pressed, a determination of its technological properties and the result of motor and simulation tests indicated excellent strength as well as heat and corrosion resistance.

Figure 2:
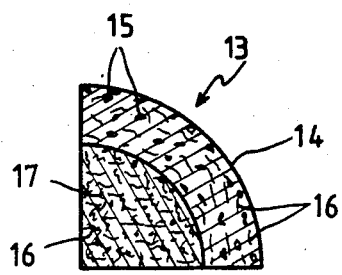
FIG. 2 is a cross-sectional detailed view of another embodiment of a sliding ring made in accordance with the present invention.

FIG. 2 shows the sealing ring 13 of this Example 2. Slide surface region 14 contains a large proportion of sliding agent 15 and a correspondingly small proportion of fibers 16 so that, in the slide region 14, ring 13 slides without difficulty. Seal part 17, which is stressed primarily statically, contains a large proportion of fibers 16 which are intertwined in a felt-like manner. In this area, the ring has high strength but is still flexible so that it is able to adapt itself to the static sealing faces.

EXAMPLE 3

The starting materials are three different mixtures of fibers, sliding agent and additives. The composition of each mixture is as follows:

Mixture 1

10 parts by weight high-grade steel fibers (length 3 mm, diameter 0.15 mm)
90 parts by weight flaked graphite and 5 parts by weight sodium thiosulfate (fine grained)

Mixture 2

90 parts weight weight high-grade steel fibers (length 3 mm, diameter 0.15 mm)
30 parts by weight flaked graphite
30 parts by weight diatomaceous earth (fine grained)
5 parts by weight phenol resin binder (fine grained)

Mixture 3

90 parts by weight high-grade steel fibers (length 3 mm, diameter 0.15 mm)
20 parts by weight polyaramid fibers (length 3 mm, diameter 0.15 mm)
20 parts by weight flaked graphite To form a sealing ring 18, the three mixtures in succession are put into the mold so that mixture 1 forms the sliding region, mixture 2 forms the core and mixture 3 forms the sealing region which is under static stress in the sealing ring.

A test of the technological parameters and an engine test indicated good suitability of the sealing ring.

Figure 3:
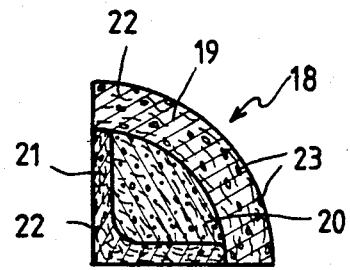
FIG. 3 is a cross-sectional detailed view of still another embodiment of a sliding ring made in accordance with the present invention.

FIG. 3 shows three zones, 19, 20, 21, of the sealing ring 18. Zone 19 containing the smaller proportion of fibers 22 and a large proportion of sliding agent 23 is comprised of mixture 1 and forms the sliding portion. Zone 20 forms the core and comprises mixture 2 which has particularly great strength due to the proportion of binder it contains.

Zone 21 is comprised of mixture 3. Due to a large proportion of fibers 22 being plastic polyaramid fibers, zone 21 is still flexible and is able to adapt itself to the sealing faces which are under static stress.

It will be understood that the above description of the present invention is susceptible to various modifications, changes and adaptations, and the same are intended to be comprehended within the meaning and range of equivalents of the appended claims.

What is claimed is:

1. A method for making a temperature resistant sealing ring for sealing an articulated connection between two components of an exhaust system of an internal combustion engine, comprising the steps of:
   forming a mixture which includes metal fibers and particles of a sliding agent, said metal fibers having an average length of between about 2 and about 8 mm and having an average diameter of between about 0.05 mm and about 0.6 mm; and
   compressing said mixture.

2. The method of claim 1, further comprising the step of introducing said mixture into a mold before said step of compressing the mixture is conducted.

3. The method of claim 2, further comprising the step of electrochemically coating at least a portion of said fibers with a metal before said step of forming a mixture is conducted.

4. The method of claim 2, wherein said step of forming a mixture is conducted by mixing at least said metal fibers, said sliding agent, and nonmetallic fibers.

5. The method of claim 4, further comprising the step of roughening said nonmetallic fibers before said step of forming a mixture is conducted.

6. The method of claim 4, further comprising the step of coating at least a portion of said nonmetallic fibers with an organic polymer before said step of forming a mixture is conducted.

7. The method of claim 2, wherein said step of forming a mixture in conducted by mixing at least said metal fibers, said sliding agent, and a substance which pyrolizes in the heat of operation of said sealing ring.

8. The method of claim 2, wherein said step of forming a mixture is conducted by mixing at least said metal fibers, said sliding agent, and a solid binder.

9. The method of claim 2, wherein said step of forming a mixture is conducted by mixing at least said metal fibers, said sliding agent, and a solid filler.

10. The method of claim 2, wherein said step of comprising the mixture comprises pressing said mixture under a load of at least about 50 tons.

11. The method of claim 2, wherein one of said components terminates in a flared portion and the other of said components terminates in a tubular portion which fits within said flared portion, said sealing ring being installed between said flared portion and said tubular portion, and further comprising the step of varying the ratio of sliding agent to fiber within said sealing ring to provide a region adjacent said flared portion that is enriched with sliding agent and a region adjacent said tubular portion that is enriched with fiber.

12. The method of claim 2, further comprising the steps of forming an additional mixture which includes metal fibers and sliding agent, said mixture and additional mixture having different ratios of fibers to sliding agent, and introducing said additional mixture into said mold after said mixture is introduced into said mold to form a sealing ring having regions with different ratios of fibers to sliding agent.

13. The method of claim 2, wherein said step of forming a mixture is conducted by shaking.

14. The method of claim 2, wherein said step of forming a mixture is conducted by stirring.

15. The method of claim 2, further comprising moving the mixture, while it is in the mold and before it is compressed, to vary the distribution of fibers and sliding agent.

16. A temperature resistant sealing ring for sealing an articulated connection between two components of an exhaust system of an internal combustion engine, comprising:
a compressed mixture which includes metal fibers and particles of a sliding agent, the fibers having an average length of between 2 and 8 mm and having an average diameter of between 0.05 and 0.6 mm.

17. Sealing ring as defined in claim 16, wherein the sealing ring additionally includes non-metallic fibers.

18. Sealing ring as defined in claim 16, wherein the metal fibers are comprised of alloyed steel, unalloyed steel, copper, aluminum, bronze or brass, individually or in mixture.

19. Sealing ring as defined in claim 18, wherein at least part of the matal fibers has a metallic coating of at least one of the metals nickel, zinc, copper, tin or aluminum.

20. Sealing ring as defined in claim 17, wherein the non-metallic fibers are comprised of ceramics, glass wool, slag wool or rock wool, individually or in mixture.

21. Sealing ring as defined in claim 17, wherein the non-metallic fibers are comprised of heat resistant polyamide, polyaramid, polyimide, or fluoropolymer fibers, individually or in mixture.

22. Sealing ring as defined in claim 17, wherein the surfaces of at least part of the fibers are roughened by means of at least one process which is a chemical process or mechanical process.

23. Sealing ring as defined in claim 17, wherein the surfaces of at least part of the fibers are provided with an organic coating based on an organic binder.

24. Sealing ring as defined in claim 16, wherein the sealing ring is comprised of 10 to 90 parts by weight of fibers and 10 to 90 parts by weight sliding agent.

25. Sealing ring as defined in claim 16, wherein the sliding agent is in flake or powder form and is comprised of graphite, boron nitride, calcium fluoride, slide metal, molybdenum disulfide or mica, individually or in mixture.

26. Sealing ring as defined in claim 16, wherein the sealing ring additionally contains an organic fiber which, under the operating temperature encountered by the sealing ring, carbonizes and forms carbon fibers.

27. Sealing ring as defined in claim 16, wherein the sealing ring additionally contains up to 20 parts by weight of a binder which hardens under pressure or increased temperature, or under pressure and increased temperature.

28. Sealing ring as defined in claim 16, wherein the sealing ring contains up to 100 parts by weight of a powdered to finely fibrous filler of mineral substances or metals, individually or in mixture.

29. Sealing ring as defined in claim 16, wherein fiber components, sliding agent and any additives which may be present are uniformly distributed over the cross section of the sealing ring.

30. Sealing ring as defined in claim 16, wherein the sealing ring has a jacket face which serves as a sliding surface and defines a slide face region, the sealing ring additionally contains a sealing ring region which is subjected merely to static stress, and the proportion of sliding agent in the slide face region of the sealing ring is greater than in the sealing ring region subjected merely to static stress.

31. Sealing ring as defined in claim 30, wherein the sealing ring has at least two axially superposed zones, which contain different proportions of fiber, sliding agent and any additives which may be present.

32. Sealing ring as defined in claim 30, wherein between the axially superposed zones, there exists a further region which contains a mixture having different proportions of the superposed fibers, sliding agent and any additives which may be present.

* * * * *